(12) United States Patent
Al-Dhahir

(10) Patent No.: US 7,583,748 B2
(45) Date of Patent: *Sep. 1, 2009

(54) FREQUENCY-DOMAIN METHOD FOR JOINT EQUALIZATION AND DECODING OF SPACE-TIME BLOCK CODES

(76) Inventor: Naofal Al-Dhahir, 105 Harter Rd., Morris Township, NJ (US) 07960

( * ) Notice: Subject to any disclaimer, the term of this patent is extended or adjusted under 35 U.S.C. 154(b) by 0 days.

This patent is subject to a terminal disclaimer.

(21) Appl. No.: 12/154,795

(22) Filed: May 27, 2008

(65) Prior Publication Data
US 2008/0232505 A1 Sep. 25, 2008

Related U.S. Application Data

(63) Continuation of application No. 11/488,390, filed on Jul. 18, 2006, now Pat. No. 7,379,508.

(51) Int. Cl.
*H04B 7/02* (2006.01)
(52) U.S. Cl. ........................ 375/267; 375/260
(58) Field of Classification Search ............... 375/267, 375/260, 299, 295, 265
See application file for complete search history.

(56) References Cited

U.S. PATENT DOCUMENTS

| | | | | |
|---|---|---|---|---|
| 6,148,024 A * | 11/2000 | Ho et al. | | 375/222 |
| 6,614,861 B1 * | 9/2003 | Terry et al. | | 375/347 |
| 6,771,706 B2 * | 8/2004 | Ling et al. | | 375/267 |
| 6,853,688 B2 * | 2/2005 | Alamouti et al. | | 375/265 |
| 7,173,976 B1 * | 2/2007 | Al-Dhahir | | 375/267 |
| 7,379,508 B1 * | 5/2008 | Al-Dhahir | | 375/267 |
| 2003/0021355 A1 * | 1/2003 | You | | 375/267 |

* cited by examiner

*Primary Examiner*—Emmanuel Bayard
(74) *Attorney, Agent, or Firm*—Henry Brendzel

(57) ABSTRACT

Space-time block coding is combined with single-carrier, minimum-mean-square-error, frequency-domain equalization for wireless communication through a medium characterized by multi-paths. The transmitter encodes incoming symbols into two or more streams that are transmitted over a corresponding number of transmitting antennas. The encoding employs modulo arithmetic. Decoding in the receiver proceeds by converting received signals to frequency domain, linearly combining the signals to separate contribution of the signals from the two or more transmitting antennas equalizing the separated signals, converting the equalized signals to time domain, and applying the converted signals to a decision circuit.

2 Claims, 2 Drawing Sheets

CP=CYCLIC PREFIX

CP=CYCLIC PREFIX

FREQUENCY-DOMAIN METHOD FOR JOINT EQUALIZATION AND DECODING OF SPACE-TIME BLOCK CODES

RELATED APPLICATIONS

This application is a continuation application of Ser. No. 11/488,390 filed in the United States Patent Office Jul. 18, 2006 now U.S. Pat. No. 7,379,508. This application is also related to U.S. Ser. No. 11/231,451 filed Sep. 21, 2005 and U.S. Ser. No. 10/026,148 filed Dec. 19, 2001 (U.S. Pat. No. 7,092,450) which claims benefit of Provisional Application 60/282,634, filed Apr. 9, 2001,

BACKGROUND OF THE INVENTION

This relates to space-time coding, and more particularly, to frequency domain equalization in a receiver that receives signals from a multi-path channel.

M. V. Clark, in "Adaptive Frequency-Domain Equalization and Diversity Combining for Broadband Wireless Communications," *IEEE Journal on Selected Areas in Communications*, pp. 1385-1395, October 1998, has shown that single-carrier minimum-mean-square-error frequency-domain (SC MMSE FDE) is an attractive equalization scheme for broadband wireless channels that are characterized by their long impulse response memories. Primarily the advantage of this approach accrues from using the computationally efficient Fast Fourier Transform (FFT), which compares favorably with time-domain equalization, where complexity grows exponentially with channel memory or require very long FIR filters to achieve acceptable performance. Further more, H. Sari et al, in "Transmission Techniques for Digital Terrestrial TV Broadcasting," *IEEE Communications Magazine*, pp 100-190, February 1995, have shown that SC MMSE FDE has two main advantages over Orthogonal Frequency Division Multiplexing (OFDM); namely, lower peak-to-average ration, and reduced sensitivity to carrier frequency errors.

Diversity transmission using space-time block coding, for example, like disclosed in U.S. Pat. No. 6,185,258, has been proposed for several wireless standards because of the many attractive features of such coding. The SC MMSE FDE was combined with receive diversity by G. Kadel, in "Diversity and Equalization in Frequency Domain—A Robust and Flexible Receiver Technology for Broadband Mobile Communications Systems," *VTC*, pp. 894-898, May 1997. There has also been some recent work on combining the scheme disclosed in the U.S. Pat. No. 6,185,258 patent with OFDM, as reported by Liu et al in "Decoding and Equalization of Unknown Multipath Channels Based on Block Precoding and Transmit-Antenna Diversity," *Asilomar Conf. On Signals, Systems, and Computers*, pp. 1557-1561, 1999. However, it has not been realized that various communication advantages result from combining space-time block coding with SC MMSE FDE.

SUMMARY OF THE INVENTION

An advance in the art is achieved by combining space-time block coding in a transmitter, for example, of a mobile unit, with SC MMSE FDE in a responsive receiver, for example in a base station. Illustratively, in a two transmitting antenna arrangement, the transmitter handles two blocks of N incoming symbols $x_a(n)$ and $x_b(n)$ at a time, encodes the block of N symbols into two streams, and transmits the two streams over two separate antennas in two consecutive frames, k, and k+1. In frame k, one antenna transmits symbols $x_1^k(n)$, while the other antenna transmits symbols $x_2^k(n)$. Symbols $x_1^k(n)$ can, for example, equal symbols $x_a(n)$, while symbols $x_2^k(n)$ can equal $x_b(n)$. In frame k+1, the one antenna transmits symbols $x_1^{k+1}(n)$, while the other antenna transmits symbols $x_2^{k+2}(n)$. The relationships adopted for $x_1^{k+1}(n)$ and $x_2^{k+2}(n)$ are $x_1^{k+1}(n) = -\bar{x}_2^k((-n)_N)$ and $x_2^{k+1}(n) = \bar{x}_1^k((-n)_N)$ where $\bar{x}_2^k$ is the complex conjugate of $\bar{x}_2^k$. At the receiver, the received signal is transformed into the frequency domain, processed, equalized, transformed to time domain, and applied to a slicer to recover the transmitted sequences $x_1^k(n)$ and $x_2^k(n)$.

More specifically, the processing within the receiver multiplies Y, (which is the received signal that is transformed into the frequency domain) by $\Lambda^*$. The matrix $\Lambda^*$ is the complex conjugate of $\Lambda$, where $$\Lambda = \begin{bmatrix} \Lambda_1 & \Lambda_2 \\ \Lambda_2^* & -\Lambda_1^* \end{bmatrix},$$

$\Lambda_1$ is a diagonal matrix with elements (q,q) that are equal to the $q^{th}$. DFT coefficient of the transfer function between the one transmitting antenna and the receiver, and $\Lambda_2$ is a diagonal matrix with elements (q,q) that are equal to the $q^{th}$ DFT coefficient of the transfer function between the other transmitting antenna and the receiver. Signal Y comprises signal $Y^k$ for frame k, and signal $Y^{k+1}$ for frame k+1. The frequency domain equalization is effected through multiplication of the signals forming vectors $Y^k$ and $Y^{k+1}$ by a diagonal matrix whose elements are related to the DFT coefficients between the one transmitting antenna and the receiver, and the other transmitting antenna and the receiver.

Extension of the principles disclosed herein to arrangements where several transmitting unit concurrently operate on the same carrier frequency is also disclosed.

DETAILED DESCRIPTION

The following mathematical development focuses on a system having two transmit antennas and one receive antenna. It should be understood, however, that a skilled artisan could easily extend this mathematical development to more than two transmit antennas, and to more than one receive antenna.

Figure 1:
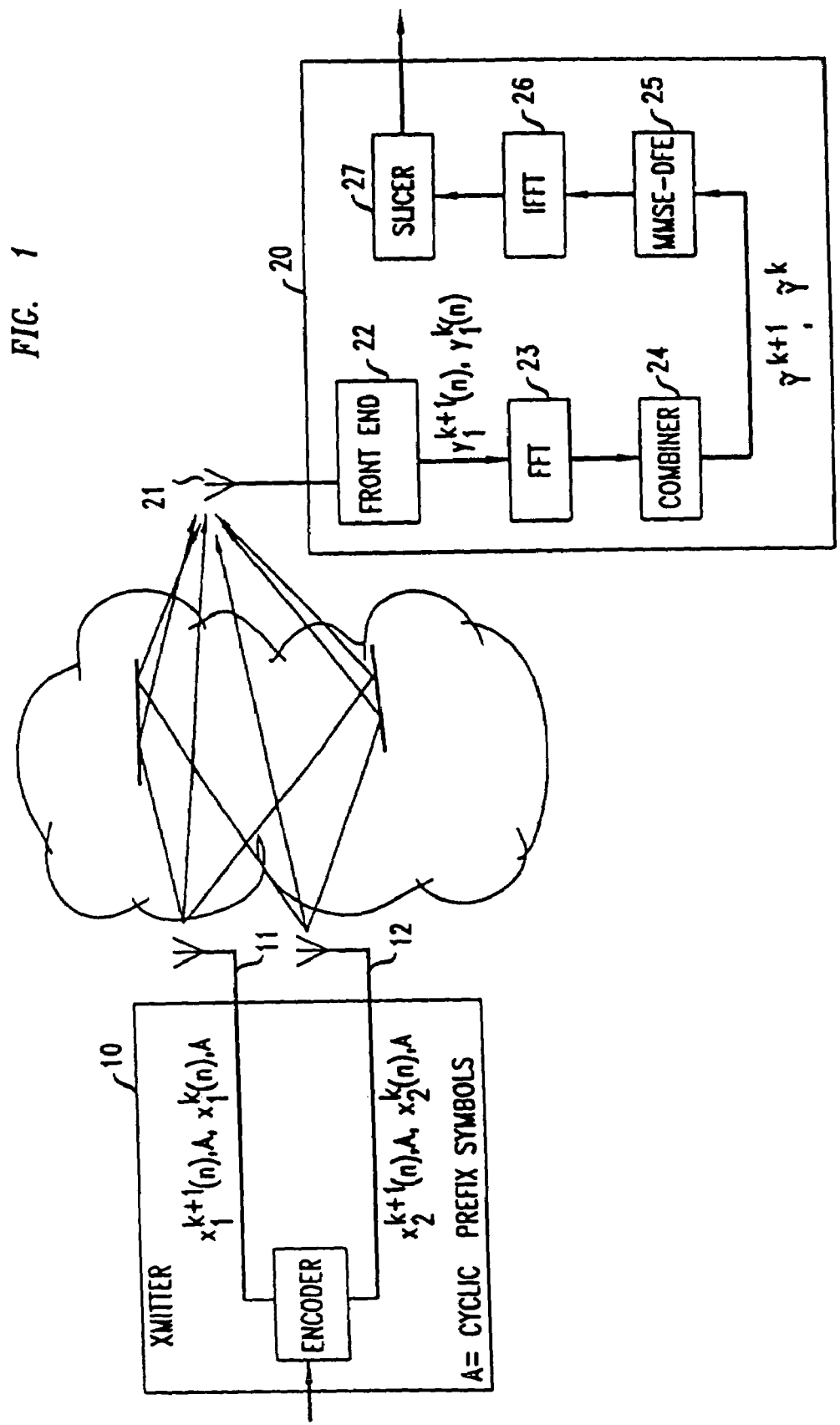
FIG. 1 shows a an illustrative arrangement of a two-antenna transmitter that is implemented in accordance with this disclosure, and a one antenna receiver that employs minimum-mean-square-error frequency-domain equalization (MMSE-FDE) equalization in accordance with this disclosure, with an interposed transmission channel having a memory of v symbol periods.

FIG. 1 shows an arrangement that includes a transmitter with two transmit antennas 11 and 12, a receiver 20 with antenna 21, and a transmission channel therebetween that has a memory of v symbols periods. The transmission channel between antennas 11 and 21 can be represented as a finite impulse response filter with v+1 taps having values $h_1(0)$, $h_1(1), \ldots h_1(v)$, forming vector $h_1$. Similarly the channel between antennas 12 and 21 can be represented by $h_2$. Within transmitter 10, encoder 15 outputs symbol blocks k=1, 2, 3, . . . , of two length N sequences; with one sequence, $X_1^k(n)$, n=0, 1, 2, . . . N−1, being transmitted by antenna 11, and the other sequence, $x_2^k(n)$, n=0, 1, 2, . . . N−1, being transmitted by antenna 12. In vector notation, the sequences can be expressed by $x_1^k$ and $x_2^k$, respectively. Because the transmission channel between transmitter 10 and receiver 20 has memory of v symbols, absent any protection, a receiver will commingle receptions from adjacent blocks. To avoid this, transmitter 10 includes a control signal that causes encoder 15 to precede each block with a string of v prefix symbols. In accordance with the principles disclosed herein, the symbols are selected to create a circulant transfer matrix between transmitter (for example, of a mobile unit) 10 and receiver to (for example, of a base station), as shown below.

It was discovered that advantageous results accrue from encoder 15 generating sequences such that the blocks of generated sequences are generated in pairs, k and k+1, where $$x_1^{k+1}(n) = -\bar{x}_2^k((-n)_N) \text{ and } x_2^{k+1}(n) = \bar{x}_1^k((-n)_N) \quad (1)$$

for n=0, 1, . . . N−1 and k=0, 2, 4, . . . , where $\bar{x}_a$ denotes complex conjugation of $x_a$, (subscript a being either 1 or 2), and $(.)_N$ denoted modulo-N operation. In other words, when encoder 15 generates the information sequence $$\{x(0), x(1), x(2), \ldots x(N-2)x(N-1)\},$$

for antenna 11 for frame k, it concurrently generates the information sequence $$\{\bar{x}(0), \bar{x}(N-1), \bar{x}(N-2), \ldots \bar{x}(2), \bar{x}(1),\}$$

for antenna 12 for or frame k+1. From equation (1) and the fact that $X_a^k = Q x_a^k$, where Q is the orthogonal Discrete Fourier Transform (DFT) matrix whose (p,q) element is given by $$Q(p, q) = \frac{1}{\sqrt{N}} e^{-j \frac{2\pi}{N} pq},$$

and $0 \leq p, q \leq N-1$, is it follows that $$X_1^{k+1}(m) = -\bar{X}_2^k(m) \text{ and } X_2^{k+1}(m) = \bar{X}_1^k(m). \quad (2)$$

As will become clear from the disclosure below, the relationship of equation (2) allows for frequency domain decoupling in a receiver the contributions of sequences $x_1^k(n)$ and $x_2^k(n)$. Accordingly, for purposes of this disclosure, such encoding—the encoding of equation (1) being one example thereof, is termed "frequency domain decouplable contributions" (FD-DC) encoding. It is encompassed by a class of orthogonal designs, as disclosed, for example, in U.S. Pat. No. 6,088,408, issued Jul. 11, 2000

Figure 2:
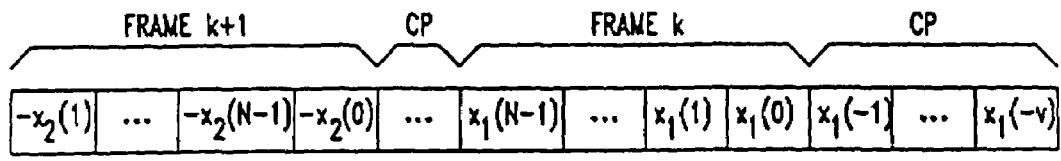
FIG. 2 shows the symbol stream that is generated by encoder 15 of FIG. 1.

FIG. 2 presents the image of a sequence that encoder 15 delivers to antenna 11, with the prefix string consisting symbols $x_1(-v)$ through $x_1(-1)$, followed by symbols $x_1(0)$ through $x_1(N-1)$. Ignoring the subscript, the signals received at antenna 21 in response to signals transmitted by antenna 11, starting with signal y(0), which corresponds to the received signal at the time the encoded signal x(0) is transmitted by antenna 11, can be expressed by the following matrix equation:

$$\begin{bmatrix} y(0) \\ y(1) \\ \vdots \\ y(v) \\ y(v+1) \\ \vdots \\ y(N-1) \end{bmatrix} = \quad (3)$$

$$\begin{bmatrix} h(v) & h(v-1) & \ldots & h(1) & h(0) & 0 & \ldots & 0 \\ 0 & h(v) & \ldots & h(2) & h(1) & h(0) & \ldots & 0 \\ \vdots & \vdots & \ddots & \vdots & \vdots & \vdots & \ddots & \vdots \\ 0 & 0 & \ldots & 0 & h(v) & h(v-1) & \ldots & 0 \\ 0 & 0 & \ldots & 0 & 0 & h(v) & \ldots & 0 \\ \vdots & \vdots & \ddots & \vdots & \vdots & \vdots & \ddots & \vdots \\ 0 & \ldots & 0 & 0 & 0 & 0 & \ldots & h(0) \end{bmatrix} \begin{bmatrix} x(-v) \\ x(-v+1) \\ \vdots \\ x(-1) \\ x(0) \\ x(1) \\ \vdots \\ x(N-1) \end{bmatrix}$$

If the prefix sequence is chosen so that x(−i)=x(N−i) for i=1, 2, . . . v, then equation (3) can be replaced by $$\begin{bmatrix} y(0) \\ y(1) \\ \vdots \\ y(v) \\ y(v+1) \\ \vdots \\ y(N-1) \end{bmatrix} = \quad (4)$$

$$\begin{bmatrix} h(0) & 0 & 0 & \ldots & h(2) & h(1) \\ h(1) & h(0) & 0 & \ldots & h(3) & h(2) \\ \vdots & \vdots & \vdots & \ddots & \vdots & \vdots \\ h(v-1) & h(v-2) & h(v-3) & \ldots & 0 & h(v) \\ h(v) & h(v-1) & h(v-2) & \ldots & 0 & 0 \\ \vdots & \vdots & \vdots & \ddots & \vdots & \vdots \\ 0 & 0 & 0 & \ldots & h(1) & h(0) \end{bmatrix} \begin{bmatrix} x(0) \\ x(1) \\ x(2) \\ \vdots \\ x(N-2) \\ x(N-1) \end{bmatrix}.$$

Returning to the use of subscripts to indicate the transmitting antenna, and superscripts to indicate symbol blocks, and recognizing that antenna 21 receives signals transmitted by antenna 12 as well as by antenna 11, we get $$y^k = H_1 x_1^k + H_2 x_2^k + n^k \quad (5)$$

where $$H_a = \begin{bmatrix} h_a(0) & 0 & \ldots & 0 & 0 & h_a(v) & \ldots & h_a(1) \\ h_a(1) & h_a(0) & \ldots & 0 & 0 & 0 & \ldots & h_a(2) \\ \vdots & \vdots & \ddots & \vdots & \vdots & \vdots & \ddots & \vdots \\ h_a(v) & h_a(v-1) & \ldots & h_a(0) & 0 & 0 & \ldots & 0 \\ 0 & h_a(v) & \ldots & h_a(1) & h_a(0) & 0 & \ldots & 0 \\ 0 & 0 & \ldots & h_a(2) & h_a(1) & h_a(0) & \ldots & 0 \\ \vdots & \vdots & \ddots & \vdots & \vdots & \vdots & \ddots & \vdots \\ 0 & 0 & \ldots & 0 & h_a(v) & h_a(v-1) & \ldots & h_a(0) \end{bmatrix} \quad (6)$$

and the number of rows and columns in $H_a$ is N.

A matrix with the structure of $H_a$ is known as a circulant matrix, and it can be shown to have the eigen-decomposition $$H_a = Q^{-1} \Lambda_a Q \qquad (7)$$

where $(.)^*$ denotes complex-conjugate transpose, $Q^{-1}$ is the inverse DFT matrix, and $\Lambda_a$ is a diagonal matrix whose $(q,q)$ element is equal to the $q^{th}$ DFT coefficient of $h_a$. It may be noted that $Q^{-1}=Q^*$ which, of course simplifies processing since it is not necessary to compute the inverse of the matrix, and it is assumed that the characteristics of the transmission medium between transmitter 10 and receiver 20 are knows by means of any one of knows processes. See, for example. U.S. patent application Ser. No. 09/956,648 filed Sep. 20, 2001 by the inventor of this application. Accordingly, it is presumed that the DFT coefficients of $h_a$ are known and, therefore, $\Lambda_a$ is known.

It may be noted also that the above assumes that the transmission channel between transmitter 10 and receiver 20 does not change during the course of computations that are relevant to this disclosure, which is the time of two consecutive blocks.

Applying the output signals of circuit 22 to FFT circuit 23 to transform the signals of equations (5) into the frequency domain yields $$\begin{aligned} Y^k &\equiv Qy^k \\ &= Q(Q^{-1}\Lambda_1 Q)x_1^k + Q(Q^{-1}\Lambda_2 Q)x_2^k + Qn^k \\ &= \Lambda_1 Q x_1^k + \Lambda_2 Q x_2^k + Qn^k \\ &= \Lambda_1 X_1^k + \Lambda_2 X_2^k + N^k. \end{aligned} \qquad (8)$$

and $$\overline{Y}^{k+1} = \Lambda_1 X_1^{k+1} + \Lambda_2 X_2^{k+1} + N^k. \qquad (9)$$

By taking advantage of the particular encoding by encoder 15, as expressed in equation (2), one can note that equation (9) can be rewritten and expressed together with equation (8) by $$Y \equiv \begin{bmatrix} Y^k \\ \overline{Y}^{k+1} \end{bmatrix} = \begin{bmatrix} \Lambda_1 & \Lambda_2 \\ \Lambda_2^* & -\Lambda_1^* \end{bmatrix} \begin{bmatrix} X_1^k \\ X_2^k \end{bmatrix} + \begin{bmatrix} N^k \\ \overline{N}^k \end{bmatrix} \qquad (10)$$

$$Y \equiv \Lambda X + N.$$

Noting that $\Lambda$ is an orthogonal matrix, the two signals $X_1^k$ and $X_2^k$ can be decoupled by simply multiplying both sides of equation (10) by $\Lambda^*$, resulting in $$\begin{aligned} \tilde{Y} &\equiv \begin{bmatrix} \tilde{Y}^k \\ \tilde{Y}^{k+1} \end{bmatrix} \\ &= \Lambda^* Y \\ &= \begin{bmatrix} \Lambda_1\Lambda_1^* + \Lambda_2\Lambda_2^* & 0 \\ 0 & \Lambda_1\Lambda_1^* + \Lambda_2\Lambda_2^* \end{bmatrix} \begin{bmatrix} X_1^k \\ X_2^k \end{bmatrix} + \begin{bmatrix} \tilde{N}^k \\ \tilde{N}^{k+1} \end{bmatrix}. \end{aligned} \qquad (11)$$

Expressed more succinctly, $$\tilde{Y} \equiv \begin{bmatrix} \tilde{Y}^k \\ \tilde{Y}^{k+1} \end{bmatrix} = \begin{bmatrix} \tilde{\Lambda} & 0 \\ 0 & \tilde{\Lambda} \end{bmatrix} \begin{bmatrix} X_1^k \\ X_2^k \end{bmatrix} + \begin{bmatrix} \tilde{N}^k \\ \tilde{N}^{k+1} \end{bmatrix}, \qquad (12)$$

from which we get $$\begin{aligned} \tilde{Y}^k &= \tilde{\Lambda} X_1^k + \tilde{N}^k \\ \tilde{Y}^{k+1} &= \tilde{\Lambda} X_2^k + \tilde{N}^{k+1} \end{aligned} \qquad (13)$$

where $\tilde{\Lambda}=(\Lambda_1\Lambda_1^*+\Lambda_2\Lambda_2^*)$ in an N×N diagonal matrix.

Signals $\tilde{Y}^{k+1}$ and $\tilde{Y}^k$ are computed in circuit 24 from $$\begin{bmatrix} \tilde{Y}^k \\ \tilde{Y}^{k+1} \end{bmatrix} = \Lambda^* Y = \begin{bmatrix} \Lambda_1^* & \Lambda_2 \\ \Lambda_2^* & -\Lambda_1 \end{bmatrix} \begin{bmatrix} Y^k \\ \overline{Y}^{k+1} \end{bmatrix}, \qquad (14)$$

which corresponds to $$\tilde{Y}^k = \Lambda_1^* Y^k + \Lambda_2 \overline{Y}^{k+1} \qquad (15)$$

and $$\tilde{Y}^{k+1} = \Lambda_2^* Y^k - \Lambda_1 \overline{Y}^{k+1} \qquad (16)$$

where signal $Y^k$ is the output of FFT circuit 23 at block k, and signal $\overline{Y}^{k+1}$ is the complex conjugate of the output of FFT circuit 23 at block k+1.

In accord with the principles disclosed herein, for the type transmitter structure disclosed above, a single-carrier minimum-mean-square-error frequency-domain equalization (SC-MMSE-FDE) is obtained with an N×N diagonal matrix applied to the signals of equations (15) and (16), where the elements of this matrix are given by $$W(i,i) = \cfrac{1}{\tilde{\Lambda}(i,i) + \cfrac{1}{SNR}}. \qquad (17)$$

where $$SNR \equiv \frac{\sigma_x^2}{\sigma_n^2},$$

under the assumption that both the noise and the signal are "white." It is noted that the noise vector n and its DFT N have the same variance, since the are related through the orthonormal transformation, Q.

Applying the output signals obtained by combiner 24 to SC-MMSE-FDE circuit 25, wherein the matrix of equation (17) pre-multiplies the signals of equations (15) and (16), results in $$\begin{aligned} Z^k &= W\tilde{Y}^k \\ &= W\tilde{\Lambda} X_1^k + W\tilde{N}^k \end{aligned} \qquad (18)$$

where $W\tilde{\Lambda}$ is a diagonal N×N matrix with elements $$\frac{\tilde{\Lambda}(i, i)}{\tilde{\Lambda}(i, i) + \frac{1}{SNR}},$$

and $$Z^{k+1} = W\tilde{\Lambda}X_1^{k+1} + W\tilde{N}^{k+1} \tag{19}$$

Applying equation (18) and equation (19) signals of circuit 25 to inverse FFT transform circuit 26 yields $$\begin{aligned} z^k &= Q^{-1}Z^k \\ &= Q^*Z^k \\ &= Q^*W\tilde{\Lambda}X_1^k + Q^*W\tilde{N}^k \\ &= Q^*W\tilde{\Lambda}Qx_1^k + Q^*WQ\tilde{n}^k \\ &= \tilde{H}x_1^k + \tilde{n} \end{aligned} \tag{20}$$

and $$z^{k+1} = \tilde{H}x_2^k + \tilde{n} \tag{21}$$

where $\tilde{H} = Q^*W\tilde{\Lambda}Q$ has the same form as H in equation (7). Note that since the noise statistics are the same in frames k and k+1, equations (20) and (21) replace both $Q^*WQ\tilde{n}^k$ and $Q^*WQ\tilde{n}^{k+1}$ with $\tilde{n}$. Also note the $\tilde{H}$ approaches the identity matrix as the value of SNR increases. For this reason, Thus, the signals developed by circuit 26 correspond to the signals $x_1^k$ and $x_2^k$ that are filtered and equalized by matrix $\tilde{H}$, and augmented by noise. It is noted that the matrix $\tilde{H}$ approaches the identity matrix as the value of SNR increases. For this reason a simple "slicer" detector can be used to detect the signals $x_1^k$ and $x_2^k$.

Accordingly, the signals developed by circuit 26 are applied to detector 27, which is a conventional slicer, yielding the signals $x_1^k$ and $x_2^k$, from which the sequence of transmitted symbols is obtained.

Figure 3:
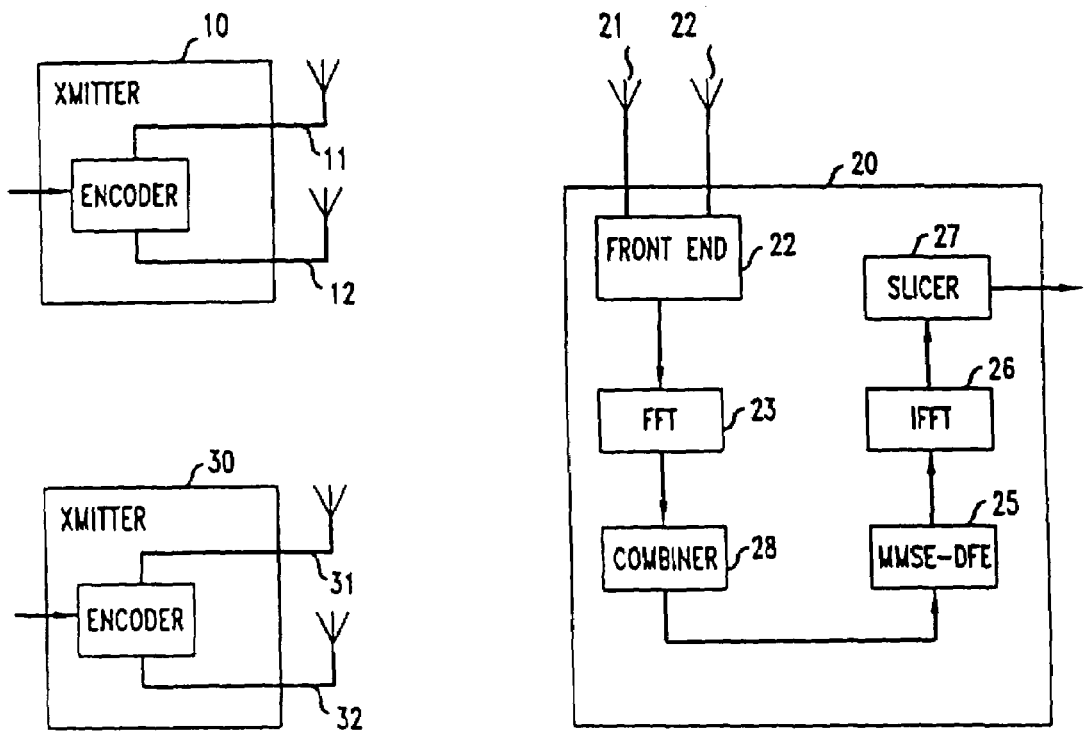
FIG. 3 presents an illustrative embodiment adapted for interference cancellation in an arrangement where several users employ the same carrier frequency to communicate with a receiver.

Expanding on the principles disclosed herein, FIG. 3 depicts an arrangement where M units (two shown) employ the same channel (i.e., the same carrier frequency) to communicate with receiver 20, which has M antennas (two shown). Corresponding to such an arrangement, equation (10) is rewritten as $$\begin{bmatrix} Y_{21} \\ Y_{22} \end{bmatrix} = \begin{bmatrix} \Lambda_{10\text{-}21} & \Lambda_{30\text{-}21} \\ \Lambda_{10\text{-}22} & \Lambda_{30\text{-}22} \end{bmatrix} \begin{bmatrix} X_{10} \\ X_{30} \end{bmatrix} + \begin{bmatrix} N_{21} \\ N_{22} \end{bmatrix}, \tag{22}$$

where $Y_{21}$ represents the signals received at antenna 21, $X_{10}$ represents signals transmitted by unit 10, $\Lambda_{10\text{-}21}$ represents the channel between unit 10 and antenna 21, $X_{30}$ represents signals transmitted by unit 30, $\Lambda_{30\text{-}21}$ represents the channel between unit 30 and antenna 21, and $N_{21}$ is the noise received at antenna 21. Similarly, $Y_{22}$ represents the signals received at antenna 22, $\Lambda_{30\text{-}22}$ represents the channel between unit 30 and antenna 22, $\Lambda_{10\text{-}22}$ represents the channel between unit 10 and antenna 22, and $N_{22}$ is the noise received at antenna 22.

The signals of the two units can be decoupled in each frame by applying the following linear, zero-forcing interference cancellation:

$$\begin{aligned} \begin{bmatrix} Y_{10}^k \\ Y_{30}^k \end{bmatrix} &= \begin{bmatrix} I & -\Lambda_{30\text{-}21}\Lambda_{10\text{-}22}^{-1} \\ -\Lambda_{30\text{-}22}\Lambda_{10\text{-}21}^{-1} & I \end{bmatrix} \begin{bmatrix} Y_{21}^k \\ Y_{22}^k \end{bmatrix} \\ &= \begin{bmatrix} I & -\Lambda_{30\text{-}21}\Lambda_{30\text{-}22}^{-1} \\ -\Lambda_{10\text{-}22}\Lambda_{10\text{-}21}^{-1} & I \end{bmatrix} \begin{bmatrix} \Lambda_{10\text{-}21} & \Lambda_{30\text{-}21} \\ \Lambda_{10\text{-}22} & \Lambda_{30\text{-}22} \end{bmatrix} \\ &\quad \begin{bmatrix} X_{10}^k \\ X_{30}^k \end{bmatrix} + \begin{bmatrix} \tilde{N}_{21}^k \\ \tilde{N}_{22}^k \end{bmatrix} \\ &= \begin{bmatrix} \tilde{\Lambda}_{10\text{-}21} & 0 \\ 0 & \tilde{\Lambda}_{10\text{-}22} \end{bmatrix} \begin{bmatrix} X_{10}^k \\ X_{30}^k \end{bmatrix} + \begin{bmatrix} \tilde{N}_{21}^k \\ \tilde{N}_{22}^k \end{bmatrix} \end{aligned} \tag{23}$$

where $\tilde{\Lambda}_{10\text{-}21} = \Lambda_{10\text{-}21} - \Lambda_{30\text{-}21}\Lambda_{30\text{-}22}^{-1}\Lambda_{10\text{-}22}$ and $\tilde{\Lambda}_{10\text{-}22} = \Lambda_{30\text{-}22} - \Lambda_{10\text{-}22}\Lambda_{10\text{-}21}^{-1}\Lambda_{30\text{-}21}$. The critical observation to make here is that both $\tilde{\Lambda}_{10\text{-}21}$ and $\tilde{\Lambda}_{10\text{-}22}$ are orthogonal matrices like matrix $\Lambda$ in equation (10) and, therefore, decoding proceeds as described above for the single unit case, and the full diversity gain is guaranteed for both users. That is, combiner 28 in FIG. 3, which is a modified version of combiner 24 in FIG. 1, first performs the processing called for by equation 23, and then proceeds as described above.

I claim:

1. A method executed in a transmitter having two antennas comprising the steps of:
   developing a first block of N incoming signals, $x_a(n)$;
   developing a second block of N incoming signals, $x_b(n)$;
   at time frame k, transmitting signal $x_1^k(n)$ over said first antenna and signal $x_2^k(n)$ over said second antenna, where $x_1^k(n) = x_a(n)$ and $x_2^k(n) = x_b(n)$; and
   at time frame j≠k, transmitting signal $x_1^j(n)$ over said first antenna and signal $x_2^j(n)$ over said second antenna, where $x_1^j(n) = -\bar{x}_2^k((-n)_N)$ and $x_2^j(n) = \bar{x}_1^k((-n)_N)$, $\bar{x}_2^k$ is the complex conjugate of $x_2^k$, and $(-n)_N$ is $(-n)$ modulo N.

2. The method of claim 1 where j=k+1.

\* \* \* \* \*